/ `US010673789B2`

(12) United States Patent
Ananthapur Bache et al.

(10) Patent No.: US 10,673,789 B2
(45) Date of Patent: Jun. 2, 2020

(54) BOT-INVOCABLE SOFTWARE DEVELOPMENT KITS TO ACCESS LEGACY SYSTEMS

(71) Applicant: International Business Machines Corporation, Armonk, NY (US)

(72) Inventors: Vijay Kumar Ananthapur Bache, Bangalore (IN); Padmanabha Venkatagiri Seshadri, Bangalore (IN); Rengia Ramaiyan Vasudevan, Kundalahalli (IN); Arun Nagarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 16/146,606

(22) Filed: Sep. 28, 2018

(65) Prior Publication Data
US 2020/0104346 A1    Apr. 2, 2020

(51) Int. Cl.
*H04L 12/58*    (2006.01)
*H04L 29/08*    (2006.01)
(Continued)

(52) U.S. Cl.
CPC ............ *H04L 51/02* (2013.01); *G06F 16/172* (2019.01); *G06F 16/9535* (2019.01);
(Continued)

(58) Field of Classification Search
CPC .......... G06F 16/00; G06F 16/10; G06F 16/17; G06F 16/172; G06F 16/9535; G06F 40/00–103; G06F 40/12; G06F 40/14; G06F 40/151; G06F 40/205; G06F 40/263; G06F 40/35–40; G10L 15/00; G10L 15/26; G10L 51/00–04; G10L 51/046;
(Continued)

(56) References Cited

U.S. PATENT DOCUMENTS

| 8,457,959 | B2 | 6/2013 | Kaiser |
| 9,569,333 | B1 | 2/2017 | Gibbon et al. |
| 2016/0117624 | A1 | 4/2016 | Flores et al. |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Tauqir Hussain
*Assistant Examiner* — Boris D Grijalva Lobos
(74) *Attorney, Agent, or Firm* — Heslin Rothenberg Farley & Mesiti P.C.; Michael Petrocelli, Esq.

(57) ABSTRACT

A method, computer program product, and a system where a processor(s), obtains, via a conversational agent executing on a client, a conversation thread and generates topic distributions. The processors(s) identifies topics and pre-fetches web content, based on utilizing the topics as search keywords. The processor(s) parses the pre-fetched web content to identify, in the pre-fetched web content, a first content type and a second content type. The processor(s) filters the parsed pre-fetched web content, to separate the first content type from the second content type and extracts a signature of a REST call associated with the pre-fetched web content from the first type of content and tokenizes the second type of content to supply context for invoking the REST call. The processor(s) generates a package that includes signature and the context and injects the package into the client so it is invocable by the conversational agent, based on the context.

20 Claims, 8 Drawing Sheets

(51) Int. Cl.
*G10L 15/26* (2006.01)
*G06F 16/172* (2019.01)
*G06F 16/9535* (2019.01)
*G06F 40/14* (2020.01)
*G06F 40/205* (2020.01)

(52) U.S. Cl.
CPC ............ *G06F 40/14* (2020.01); *G06F 40/205* (2020.01); *G10L 15/26* (2013.01); *H04L 51/046* (2013.01); *H04L 51/16* (2013.01); *H04L 67/22* (2013.01)

(58) Field of Classification Search
CPC ......... G10L 51/12; G10L 51/16; G10L 67/00; G10L 67/02; G10L 67/14; G10L 67/22
See application file for complete search history.

BOT-INVOCABLE SOFTWARE DEVELOPMENT KITS TO ACCESS LEGACY SYSTEMS

BACKGROUND

A software development kit (SDK) is a set of software development tools that allows the creation of applications for software packages, software frameworks, hardware platforms, computer systems, video gaming consoles, operating systems, and/or similar development platforms. A bot (short for "robot") is an automated program that runs over the Internet. Some bots run automatically, while others only execute commands when the bots receive specific input. There are many different types of bots, but some common examples include web crawlers, chat room bots, and malicious bots.

Conversational interfaces (i.e., user interfaces that mimics human conversations), are becoming more popular, especially as the use of Internet of Things (IoT) devices becomes more prevalent, as the easiest-to-use interface (and sometimes the only interface) for data entry into many of these devices is a voice-activated interface, such as a conversational interface. However, much of the content available on the World Wide Web (the "web") is only accessible in a legacy hypertext markup language (HTML) format. Activities such as filling out forms and presenting retrieved data from Ajax calls (asynchronous requests initiated by the browser that do not directly result in a page transition), utilize HTML pages. A conversational interface is incompatible with these legacy pages, as conversational agents presently cannot consume HTML pages and/or mimic their functionality through natural conversations, as these pages can only be interacted with utilizing pre-set HTML content.

Existing systems attempt to bridge interactions between conversational interfaces and legacy content by allowing users to initiate, with voice commands, bot-enabled searches. Unfortunately, these systems still rely on accessing and presenting web content through traditional means, like search engines and browser-displayed pages. There is no mechanism which infers web pages from a conversation, rather than a voice command, and in response, extracts data retrieval or data submission points, and ingests them as bot-invocable SDK on client devices.

SUMMARY

Shortcomings of the prior art are overcome and additional advantages are provided through the provision of a method for providing accessibility to legacy data by generating a data structure invocable by a conversation agent. The method includes, for instance: obtaining, by one or more processors, via a conversational agent executing on a client, a conversation thread; generating, by the one or more processors, topic distributions, based on analyzing the conversation thread; identifying, by the one or more processors, topics, based on the topic distributions; pre-fetching, by the one or more processors, web content, based on utilizing the topics identified in the topics distributions as search keywords; parsing, by the one or more processors, the pre-fetched web content to identify, in the pre-fetched web content, a first content type and a second content type, wherein the first content type comprises content consistent with RESTful web services (REST), and the second content type comprises content inconsistent with REST; filtering, by the one or more processors, the parsed pre-fetched web content, to separate the first content type from the second content type; based on the filtering, extracting, by the one or more processors, a signature of a REST call associated with the pre-fetched web content from the first type of content; based on the filtering, tokenizing, by the one or more processors, the second type of content to supply context for invoking the REST call; generating, by the one or more processors, a package comprising a data structure, wherein the data structure comprises the signature and the context; and injecting, by the one or more processors, the package into the client, wherein based on the injecting the package is invocable by the conversational agent, when the conversational agent obtains a portion of the context comprising data structure.

Shortcomings of the prior art are overcome and additional advantages are provided through the provision of a computer program product for providing accessibility to legacy data by generating a data structure invocable by a conversation agent. The computer program product comprises a storage medium readable by a processing circuit and storing instructions for execution by the processing circuit for performing a method. The method includes, for instance: obtaining, by the one or more processors, via a conversational agent executing on a client, a conversation thread; generating, by the one or more processors, topic distributions, based on analyzing the conversation thread; identifying, by the one or more processors, topics, based on the topic distributions; pre-fetching, by the one or more processors, web content, based on utilizing the topics identified in the topics distributions as search keywords; parsing, by the one or more processors, the pre-fetched web content to identify, in the pre-fetched web content, a first content type and a second content type, wherein the first content type comprises content consistent with RESTful web services (REST), and the second content type comprises content inconsistent with REST; filtering, by the one or more processors, the parsed pre-fetched web content, to separate the first content type from the second content type; based on the filtering, extracting, by the one or more processors, a signature of a REST call associated with the pre-fetched web content from the first type of content; based on the filtering, tokenizing, by the one or more processors, the second type of content to supply context for invoking the REST call; generating, by the one or more processors, a package comprising a data structure, wherein the data structure comprises the signature and the context; and injecting, by the one or more processors, the package into the client, wherein based on the injecting the package is invocable by the conversational agent, when the conversational agent obtains a portion of the context comprising data structure.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
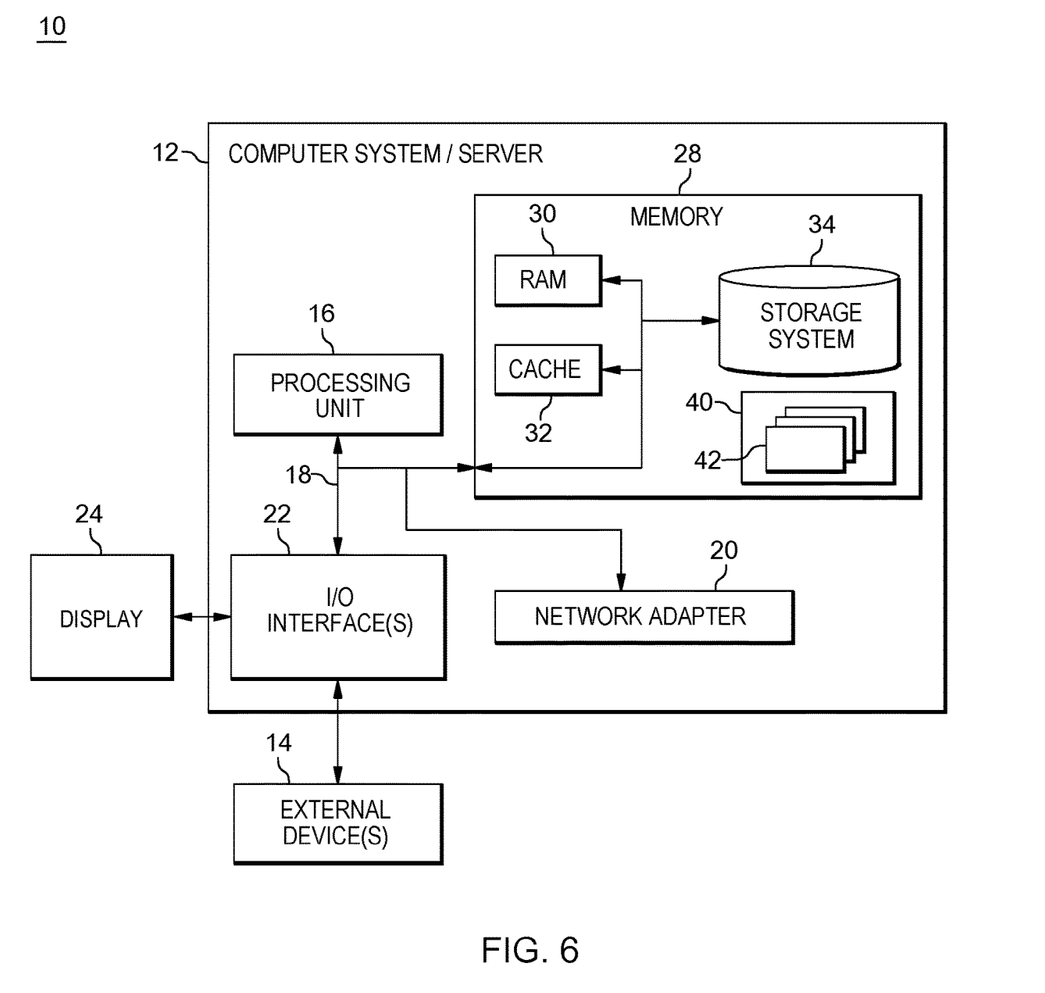
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computing system where program code executing on one or more processors packages context from legacy web pages for injection into conversational interfaces. In embodiments of the present invention, the program code: 1) finds and crawls web pages based on a conversation accessible to a conversational agent (e.g., interface) on a client computing device; 2) converts legacy (HTML) web-pages with relevant content to bot-invocable SDK; and 3) facilitates dynamic inclusion of the relevant content within the conversational agent on the client computing device. Thus, the program code in embodiments of the present invention converts legacy webpages to bot-invocable SDK/bot consumable data to be used on client devices, for presenting relative information in a conversation format. As will be discussed in greater detail herein, in converting content from legacy content to SDK/bot consumable data, in embodiments of the present invention, the program code separates the content into REST (i.e., RESTful web services) and non-REST content and filters out the REST content to extract the signature of the REST call, while tokenizing the non-REST content, to supply the context for the REST call. The program code packages the REST signature and the non-REST context for injecting into the client device, for invoking the bot, as and when context related to conversation is received by the conversational agent (e.g., interface).

In embodiments of the present invention, components of REST are utilized to provide interoperability between a conversational agent on a client computing device and legacy content available from various computing resources, over the web. As understood by one of skill in the art, REST or RESTful web services provide interoperability between computer systems on the Internet. REST-compliant web services enable a requestor to access and manipulate representations of web resources (e.g., applications) using a uniform and predefined set of stateless operations. A REST API uses general HTTP requests to GET, PUT, POST and DELETE data and relies on a stateless, client-server, cacheable communications protocol. REST is an architecture style for designing networked applications and is therefore particularly prevalent in and relevant to, multi-server (multi-resource) computing environments. Specifically, because APIs provide interoperability between computer systems and allow for standardized connectivity, they are frequently utilized as endpoints on servers that enable other resources to access applications associated with the APIs that are deployed on the servers. For example, various REST APIs may be available from each of the individual servers in a multi-server environment, such as a cloud computing environment, providing endpoints to applications, including conversational agents and legacy websites, executing or being served by, the various servers.

Embodiments of the present invention include program code that adheres to the architectural constraints that define a RESTful system, specifically, six guiding constraints that restrict the ways that a server/service/API can process and respond to client requests. If a server/service/API violates any of the required constraints, it cannot be considered RESTful. The constraints are: 1) a client-server architecture; 2) statelessness; 3) cacheability; 4) a layered system; 5) code on demand; and 6) a uniform interface. The client-server architecture constraint refers to using a client-server model, which the concept of separating the user interface concerns from the data storage concerns, which is compatible with the multiple organizational domains utilized in a web architecture. Statelessness or a stateless protocol is a constraint on client-server communication where no client context is stored on the server between requests. Rather, each request from any client contains all the information necessary to service the request, and session state is held on the client and can be transferred, by the server, to another service, such as a database, to maintain a persistent state, for a period, and allow authentication. The client begins sending requests when it is ready to make the transition to a new state. Cacheability (web cache) refers to the constraint that clients and intermediaries can cache responses. The constraint of a layered system means that while a client cannot ordinarily tell whether it is connected directly to the end server, or to an intermediary along the way. Code on demand, also understood as client-side scripting means that servers can temporarily extend or customize the functionality of a client by transferring executable code utilizing compiled components such as Java applets, and client-side scripts, such as JavaScript. The uniform interface constraints has four parts: 1) identification of individual resources in requests (e.g., using URIs in web-based REST systems) such that the resources themselves are conceptually separate from the representations that are returned to the client; 2) clients that hold resources, including attached metadata, can manipulate (e.g., modify or delete) the resources; 3) each message is self-descriptive, meaning that it includes enough information to describe how to process the message; and 4) hypermedia is the engine of application state (HATEOAS) such that a REST client, having accessed an initial URI for the REST application, is able to use server-provided links dynamically to discover all the available actions and resources it needs.

Aspects of various embodiments of the present invention are inextricably tied to computing and provide significant advantages over existing attempts to bridge conversational interfaces or agents with legacy content of the web. First, embodiments of the present invention are inextricably tied to computing at least because both the issue addressed by aspects of the present invention (i.e., interfacing conversational agents with legacy content of the web, accessible via an Internet connection) and aspects of the approach disclosed (i.e., auto-crawling HTML content based on conversational inputs to a conversational agent, separating REST and non-REST content of HTML legacy content, extracting REST signatures, and packaging of REST along with non-REST context for injection into conversational interfaces for invocation through the conversational agent), are not relevant outside of a computing context. Both the technical challenge and the solution are tied to computing and thus, inextricably linked to computing. Second, aspects of various embodiments of the present invention provide significant advantages over existing systems that address intercommunication between conversational agents and legacy web content at least because existing systems do not include program code that separates REST and non-REST content of HTML, extracts REST signatures, and supplies both the REST and non-REST context for invocation through the conversational agent.

Embodiments of the present invention provide significant advantages over existing interconnectivity approaches between conversational interfaces and legacy content at least by: 1) providing program code to convert legacy web-pages into packages, to be consumed as SDK on the client side as conversational content, as opposed to traditional web-based interaction; and 2) providing program code to process these packages only once, but disseminating and injecting them many times through opportunistic peer-to-peer connections. In contrast to these aspects, one existing approach uses conversational content to mine topics and fill slots in query templates. However, this approach, unlike aspects of some embodiments of the present invention, does not supply the legacy content for invocation by separating REST and non-REST content of HTML, extract REST signatures, and/or supply context for this invocation. This approach also does not package REST along and non-REST context for injection into conversational interfaces. Another existing approach constructs a user graph to map the user context and topic changes as to trigger actions such as adding elements to conversations, but this approach also does not package REST along and non-REST context, derived from legacy pages, for injection into conversational interfaces for invocation through the interfaces, based on the context. Unlike this existing system, embodiments of the present invention provide a dynamic feature by injecting a package (i.e., the context), which is ready for consumption within the conversational interface, based on the context. Finally, some existing approaches take as input REST-URI (uniform resource identifiers) and RSDL (RESTful service descriptor language) descriptions of REST APIs to create a REST call codes for a given programming language. Again, this approach does not address supplying context from legacy pages for invocation.

Figure 1:
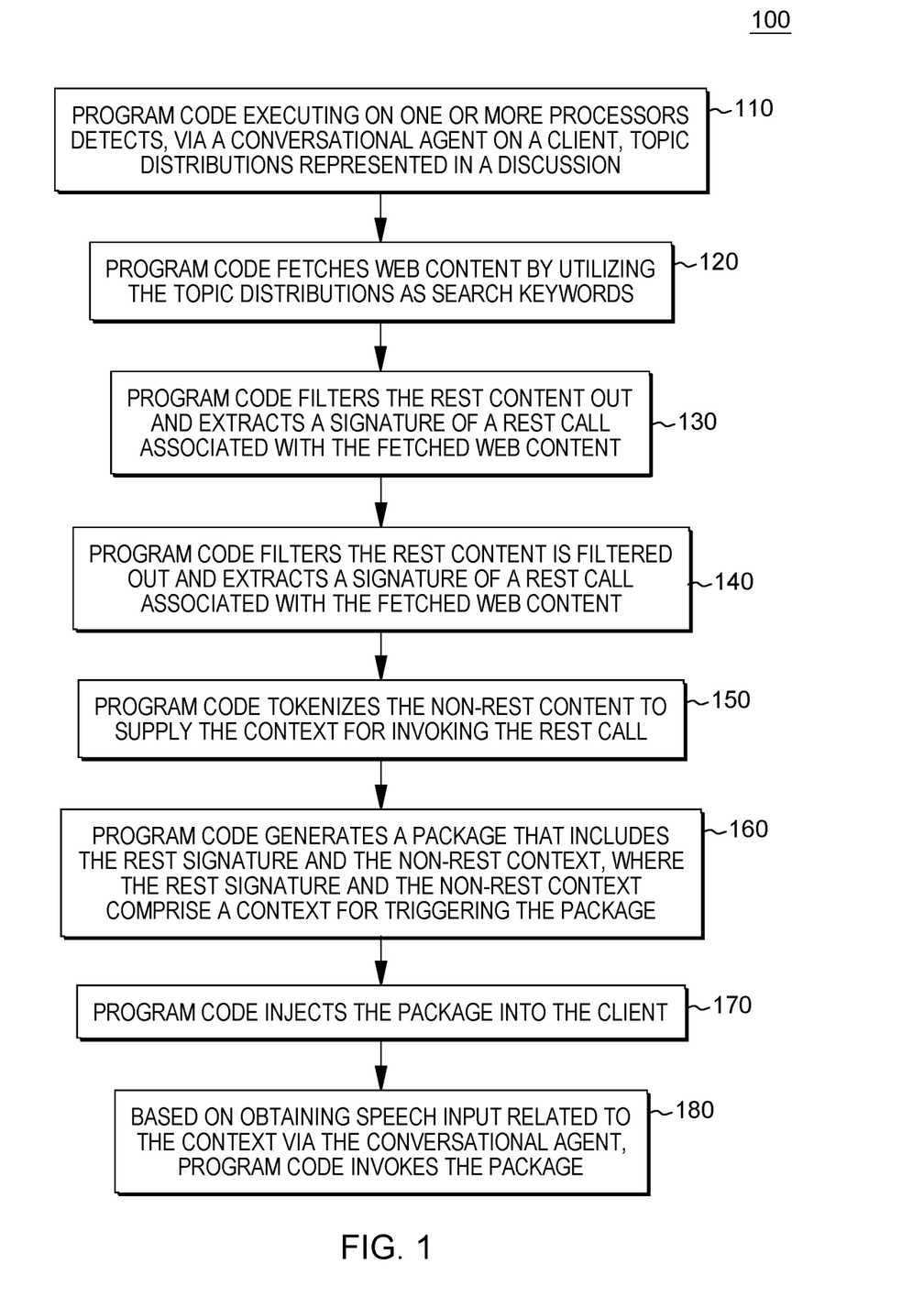
FIG. 1 is a workflow illustrating certain aspects of an embodiment of the present invention.

FIG. 1 is a workflow 100 that illustrates certain aspects of some embodiments of the present invention and depicts program code converting legacy web pages to SDK that can be invoked by bots, for use on client devices. In some embodiments of the present invention, program code executing on one or more processors detects, via a conversational agent on a client, topic distributions represented in a discussion (110). The program code fetches web content by utilizing the topic distributions as search keywords (120). The program code separates the fetched web content into REST content and non-REST content (130). The program code filters the REST content out and extracts a signature of a REST call associated with the fetched web content (140). The program code tokenizes the non-REST content to supply the context for invoking the REST call (150). The program code generates a package that includes the REST signature and the non-REST context, where the REST signature and the non-REST context comprise a context for triggering the package (160). The program code injects the package into the client (170). Based on obtaining speech input related to the context, via the conversational agent, the program code invokes the package (180). As illustrated by FIG. 1, the client can repeatedly invoke the package whenever the conversational agent obtains conversations related to the context. The program code can process responses to the invocation recursively through the aspects of FIG. 1.

Figure 2:
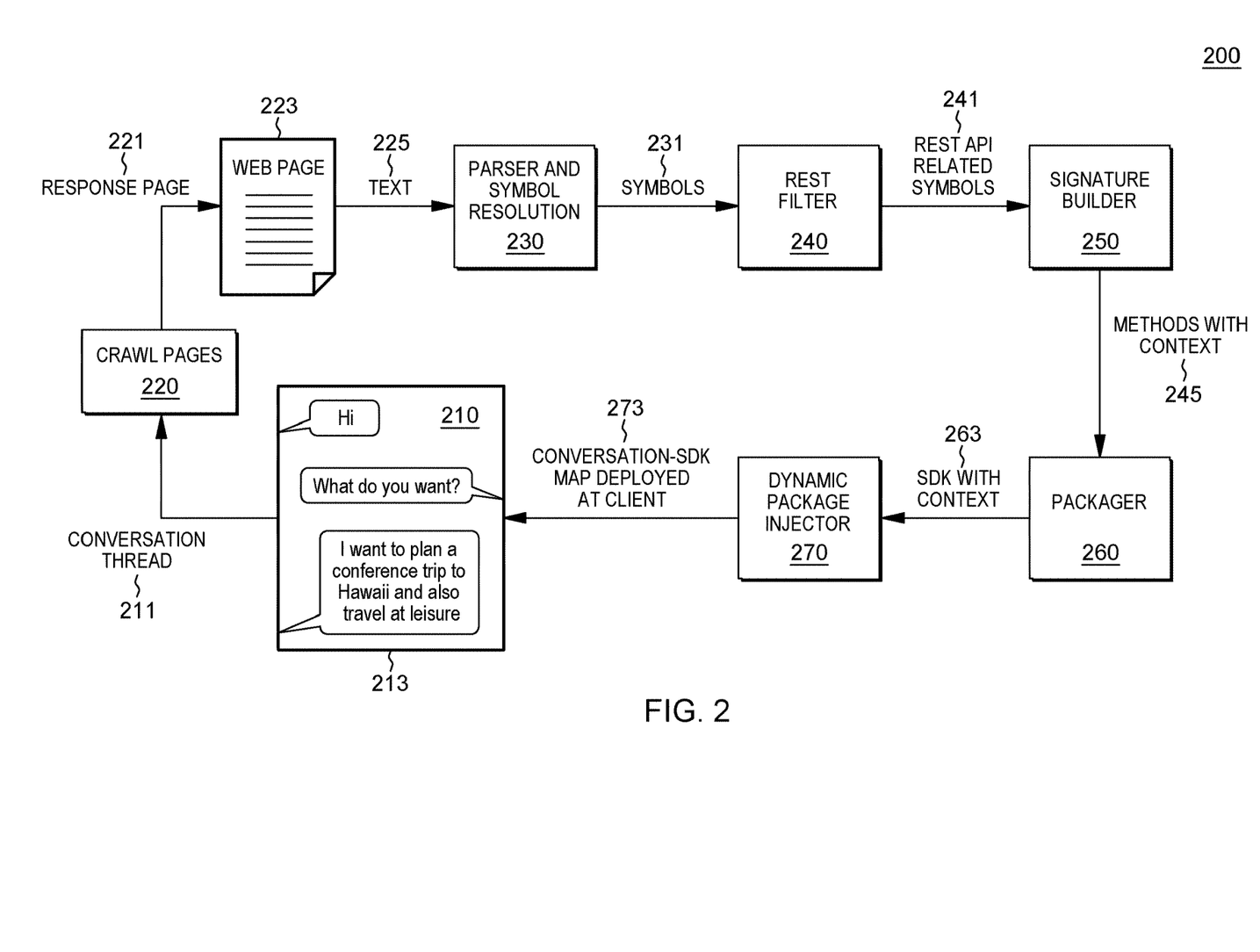
FIG. 2 is a workflow illustrating certain aspects of an embodiment of the present invention.

FIG. 2 is a workflow 200 that illustrates certain aspects of some embodiments of the present invention. The workflow 200 is illustrated as cyclical because, as noted in FIG. 1, once a package is generated by the program code in embodiments of the present invention, the client can repeatedly invoke the package whenever the conversational agent obtains conversations related to the context of the package.

Turning to FIG. 2, in some embodiments of the present invention, program code executing on at least one processor obtains conversation elements, which can be referred to as a conversation thread 211, via a conversational agent 213, on a client (e.g., a voice-activated sensor/input) (210). In the example given in FIG. 2, the conversation thread is an exchange between two parties, which is reproduced below, for illustrative purposes only.

First Party: Hi.
Second Party: What do you want?
First Party: I want to plan a conference trip to Hawaii and also travel at leisure.

In some embodiments of the present invention, the Second Party can be a computerized agent communicating via a conversational interface on the client computing device. In this example, the First Party is a user of the client computing device, interacting with the computerized agent through the conversational interface on the client computing device. In some embodiments of the present invention, the conversational interface on the client computing device captures this conversation thread by passively (or actively) listening to a conversation between two parties within the range of the interface, such that program code executing on the computing device can capture the conversation.

Figure 3:
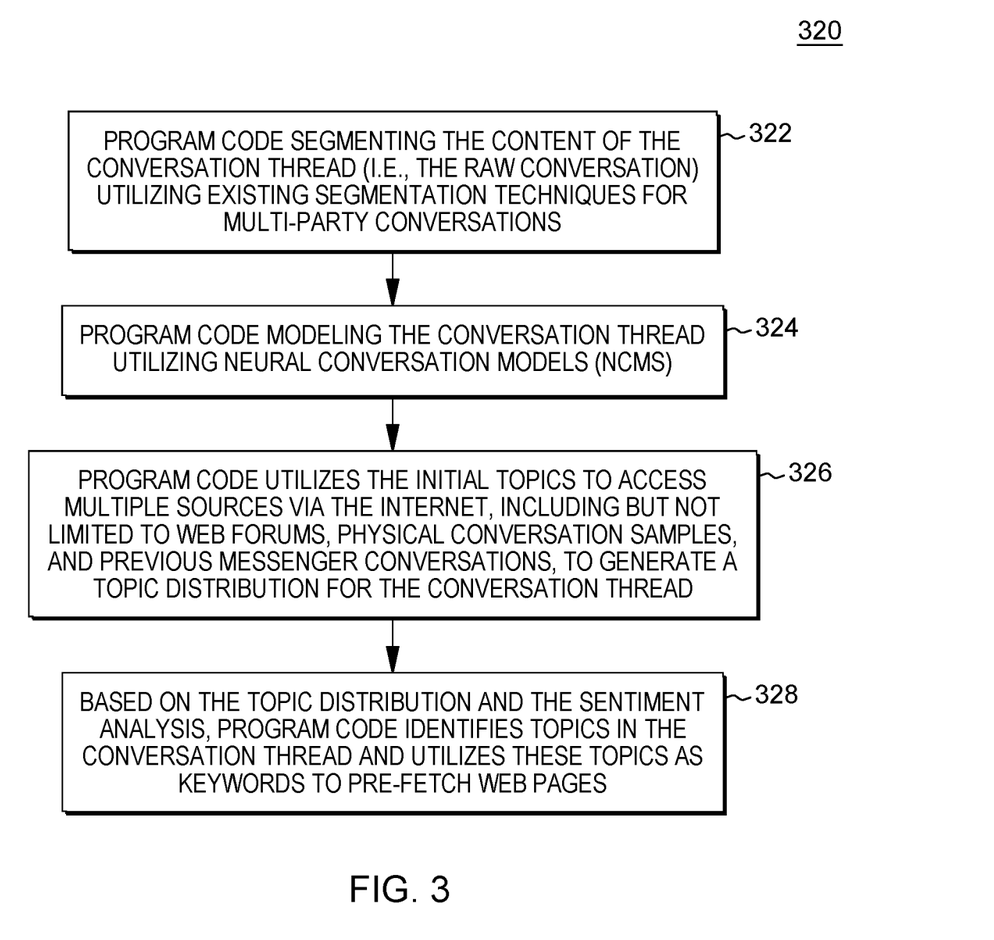
FIG. 3 is a workflow illustrating certain aspects of an embodiment of the present invention.

Returning to FIG. 2, in some embodiments of the present invention, the program code crawls pages based on the conversation thread (220). FIG. 3 is a workflow 320 illustrating the crawling (e.g., FIG. 2, 220). Referring to FIG. 3, the crawling includes the program code segmenting the content of the conversation thread (i.e., the raw conversation) utilizing existing segmentation techniques for multi-party conversations (322). The crawling also includes the program code modeling the conversation thread utilizing neural conversation models (NCMs) (324). NCMs can predict a next sentence given the previous sentence, or sentences, in a conversation, in this case, the conversation thread. By modeling and segmenting the conversation thread, the program code identifies initial topics within both the conversation thread and in predicted next sentences of the conversation (utilizing the NCM). The program code utilizes the initial topics to access multiple sources via the Internet, including but not limited to, web forums, physical conversation samples, and previous messenger conversations, to generate a topic distribution for the conversation thread (326). To generate the topic distribution, in embodiments of the present invention, based on the multiple sources and the initial topics, the program code generates topic annotations, topic probabilities and topic sentiments.

Figure 4:
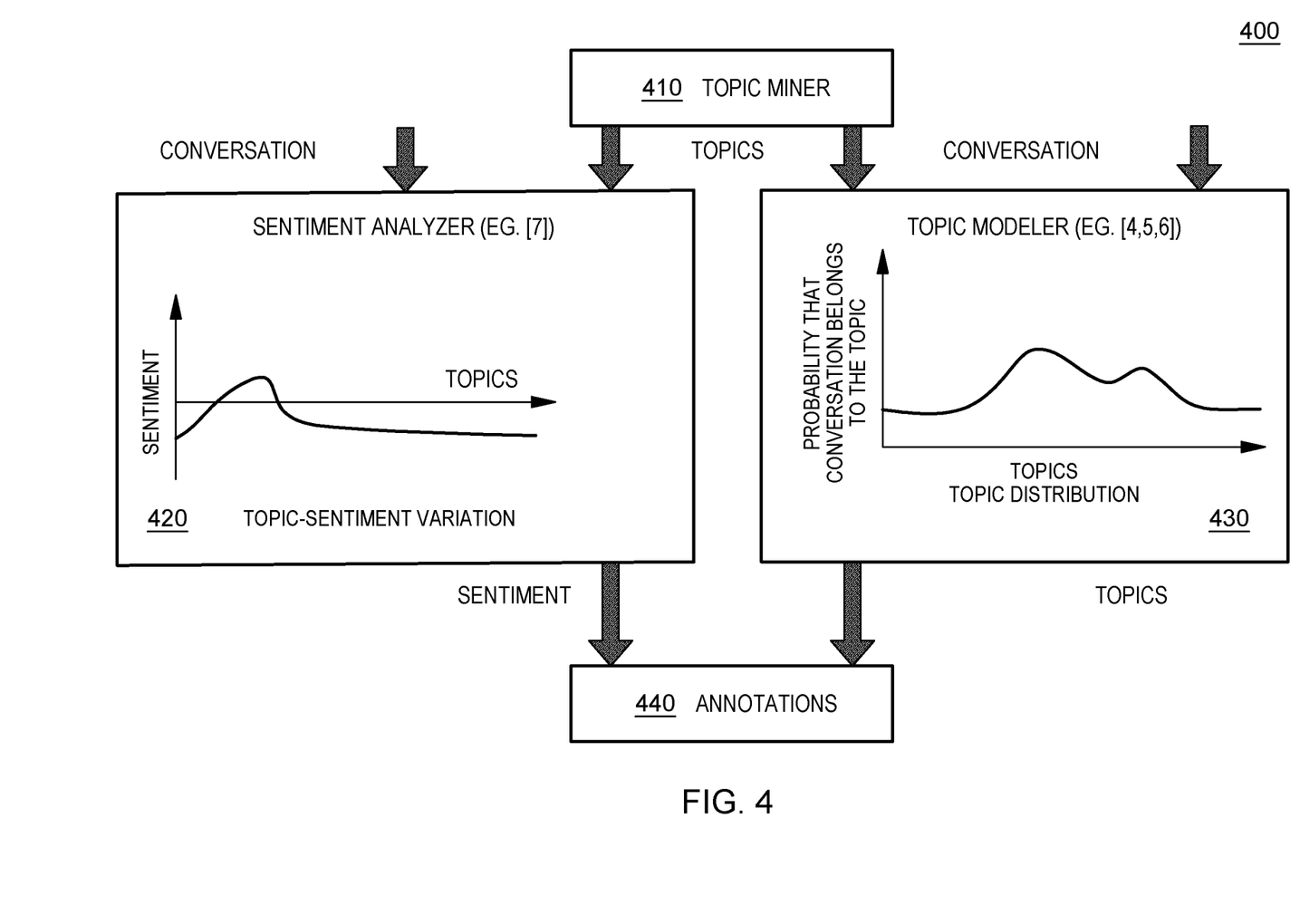
FIG. 4 is an illustration of various aspects of an embodiment of the present invention.

FIG. 4 is an example 400 of how the program code mines topics from the conversation thread (410), analyzes the sentiments of the conversation thread based on the topics (420), models a distribution of the topics of the conversation (430), and based on the sentiment analysis and topic distribution, annotates topics (440).

In some embodiments of the present invention, the program code utilizes a neural network to analyze the conversation thread to identify (annotate) topics. Neural networks are a biologically-inspired programming paradigm which enable a computer to learn from observational data, in this case, conversation threads. This learning is referred to as deep learning, which is a set of techniques for learning in neural networks. Neural networks, including modular neural networks, are capable of pattern (e.g., topic) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., topics) in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in speech recognition and natural language processing, which the program code in embodiments of the present invention accomplished as part of the program code crawling pages based on the conversation thread (e.g., FIG. 2, 220).

Some embodiments of the present invention may utilize a neural network (NN) to predict subsequent lines in the conversation of in the conversation thread. Utilizing the neural network, the program code can predict the likelihood of various topics in subsequent conversation (whether or not this conversation occurred), can be determined. The program code program code obtains (or derives) the initial topics from the conversation thread to generate an array of values (possible topics) to input into input neurons of the NN. Responsive to these inputs, the output neurons of the NN produce an array that includes the predicted topics. The program code can automatically annotate topics based on the perceived validity.

In some embodiments of the present invention, a neuromorphic processor or trained neuromorphic chip can be incorporated into the computing resources executing the program code. One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million ($2^{28}$). Memory, computation, and communication are handled in each of the 4096 neurosynaptic cores, so TrueNorth circumvents the von-Neumann-architecture bottlenecks and is very energy-efficient.

Returning to FIG. 3, based on the topic distribution and the sentiment analysis, the program code identifies topics in the conversation thread and utilizes these topics as keywords to pre-fetch web pages (328). As illustrated in FIG. 2, in some embodiments of the present invention, the program code utilizes a response page 221 to fetch one or more web pages 223 with content that is text 225. If SDK is available to the client device, the program code invokes SDK directly to perform this pre-fetch.

Returning to FIG. 2, in some embodiments of the present invention, the program code parses the pre-fetched web pages and resolves symbols in the text (code) (230). In some embodiments of the present invention, the program code, which parses the text 225, takes, as input, the pre-fetched web pages. The program code parses the HTML code comprising the web pages as well as non-HTML client-side source code (e.g., JavaScript). The program code resolves the symbols for the client-side code, identifying AJAX calls and/or hyper-link references. Thus, during the parsing, the program code generates symbols 231 and/or tokens, through the parsing and symbol resolution, from the web pages, which it passes to be filtered into REST and non-REST elements (240).

The program code filters the symbols and/or tokens, separating out the symbols and/or tokens that are related to REST, from the symbols and/or tokens that are not related to REST (240). In filtering the symbols and tokens, in some embodiments of the present invention, the program code marks symbols and/or tokens that are related to REST calls, including, but not limited to, post, get, action, URL-constants, etc. The program code also identifies REST segments and marks as related to REST tokens and/or symbols related to the identified REST segments (e.g., all tokens appearing with a <form> tag). The program code filters out the symbols and/or tokens that it does not mark, leaving symbols related to REST 241 (i.e., the REST API). In some embodiments of the present invention, the program code filters out the REST content to extract the signature (methods) of the REST call and tokenizes the non-REST content to supply the context of invocation for the REST call (245).

Referring to FIG. 2, program code in some embodiments of the present invention obtains the symbols and/or tokens that are related to REST and the identified REST segments and generates a signature call (i.e., REST signature), with the URLs of the pre-fetched one or more web pages 223 and input parameters (250). The program code generates a data structure by packaging the REST signature and the keywords (mined from the one or more web pages 223) (260). Thus, the data structure can comprise methods with context (e.g., tokenized non-REST content). In some embodiments of the present invention, the data structure is a key-cluster and value tuple. A tuple is a data structure that is an immutable, or unchangeable, ordered sequence of elements. Tuples are utilized for grouping data and are immutable, thus, their values cannot be modified. In some embodiments of the present invention, the tuple is of the following format: <key-term-vector, REST-signature>. The data structure (package) is an SDK that enables the client to interact with the legacy pages and includes the aforementioned context. The key-term-vector stores the keywords. The REST-signature fetches a result when the SDK is triggered by the conversational interface obtaining a keyword.

In some embodiments of the present invention, the program code (dynamically) injects the packaged data structure (e.g., tuple) into a map of a background agent executing on the client (270). When a conversation obtained by the conversational agent 213 obtains a keyword from the key-term-vector, the program code triggers the REST signature to fetch the result. The program code can also pre-fetch results, based on predictions on the flow of a conversation, by modeling a conversation thread, or applying an existing conversation model (e.g., FIG. 3, 324). If the output of the REST call is a HTML page, then the program code can recursively process the page by the program code parsing the pre-fetched web pages and resolving symbols in the text (code) (230). The program code generates symbols 231 and/or tokens, through the parsing and symbol resolution, from the web pages, which it passes to be filtered into REST and non-REST element (240). The program code obtains the symbols and/or tokens that are related to REST and the identifies REST segments and generates a signature call (i.e., REST signature), with the URLs (Uniform Resource Locators) of the pre-fetched one or more web pages 223 and input parameters (250), and the program code generates a data structure by packaging the REST signature and the keywords (260).

As part of the injecting (270), in some embodiments of the present invention, the program code converts results 273 to a conversational format, by generating dialogue using the NCMs (e.g., for individual users and/or user groups). As part of the injecting, the program code disseminates the packaged data structures (e.g., tuples), which the program code can pre-fetch and store through peer-to-peer mobile connections, on the client side. Disseminating the data structures to multiple devices, which are interconnected (e.g., via the IoT), limits the amount of processing responsive to various keywords (contexts).

Figure 5:
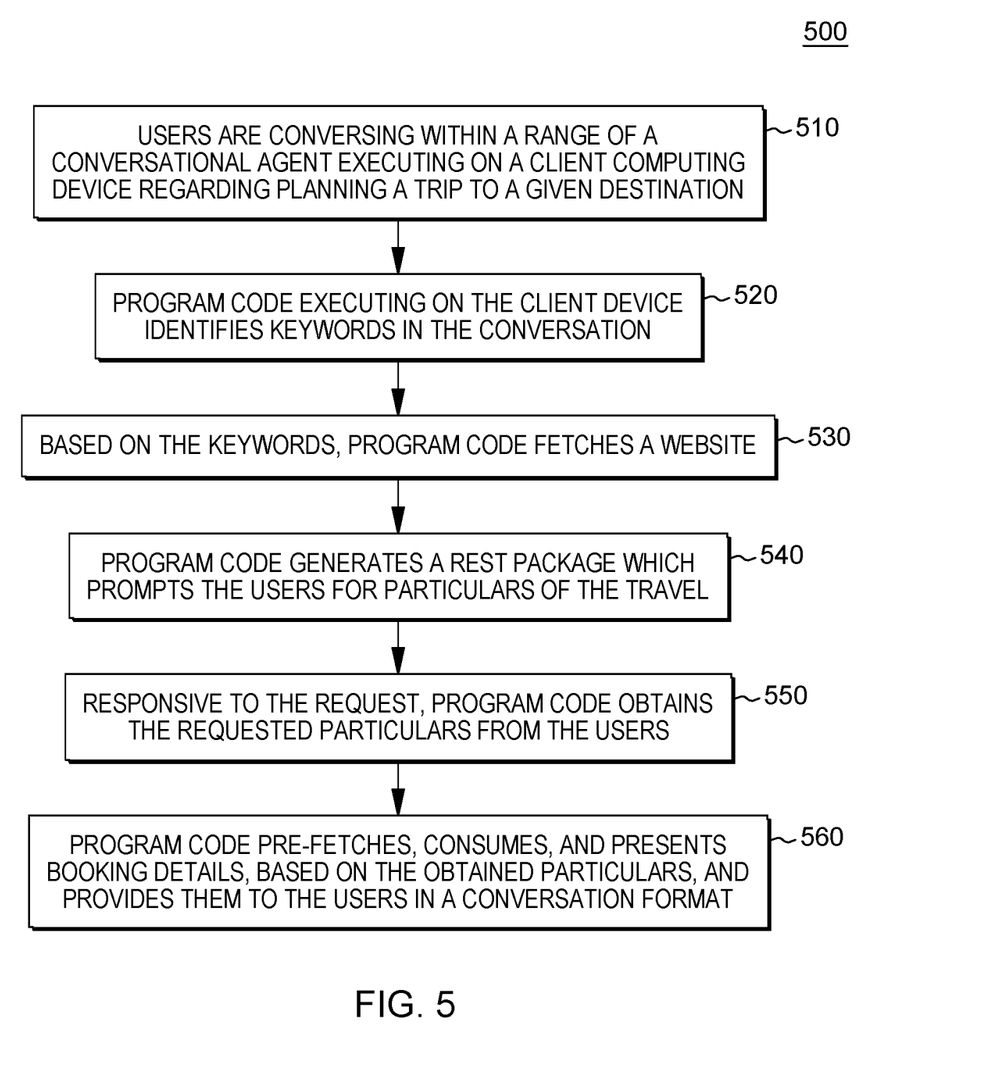
FIG. 5 is a workflow illustrating certain aspects of an embodiment of the present invention.

FIG. 5 is a workflow 500 that illustrates an example of a utilization of various aspects of some embodiments of the present invention. In this example, a group of users are conversing within a range of a conversational agent executing on a client computing device regarding planning a trip to a given destination (510). Program code identifies keywords in the conversation (e.g., "air tickets" combined with a brand name of a trip organizing brand) (520). Based on the keywords, the program code fetches a website (e.g., the website of the brand) (530). The program code generates a REST package (illustrated in FIG. 2), which prompts the users for particulars of the travel (e.g., <source-port>, <destination-port-of-entry>, <dates-of-travel> etc.) (540). Responsive to the request, the program code obtains the requested particulars from the users (550). The program code pre-fetches, consumes, and presents booking details, based on the obtained particulars, and provides them to the users in a conversation format (560).

Embodiments of the present invention include a computer-implemented method, a computer program product, and a computing system where program code executing on at least one processing circuit obtains, via a conversational agent executing on a client, a conversation thread. The program code generates topic distributions, based on analyzing the conversation thread. The program code identifies topics, based on the topic distributions. The program code pre-fetches web content, based on utilizing the topics identified in the topics distributions as search keywords. The program code parses the pre-fetched web content to identify, in the pre-fetched web content, a first content type and a second content type, wherein the first content type comprises content consistent with RESTful web services (REST), and the second content type comprises content inconsistent with REST. The program code filters the parsed pre-fetched web content, to separate the first content type from the second content type. Based on the filtering, the program code extracts a signature of a REST call associated with the pre-fetched web content from the first type of content. Based on the filtering the program code tokenizes the second type of content to supply context for invoking the REST call. The program code generates a package comprising a data structure, where the data structure comprises the signature and the context. The program code injects package into the client, where based on the injecting the package is invocable by the conversational agent, when the conversational agent obtains a portion of the context comprising data structure.

In some embodiments of the present invention, the program code obtains, via the conversational agent, the portion of the context comprising data structure. The program code invokes the REST call, based on the obtaining. The program code receives, responsive to the REST call, data responsive to the portion of the context. The program code provides the data to the client in a conversation format.

In some embodiments of the present invention, the conversational agent comprises a bot, and wherein the bot invokes the package.

In some embodiments of the present invention, the context comprises the search keywords, and wherein the portion of the context comprises one or more search keywords.

In some embodiments of the present invention, the program code generating topic distributions, based on analyzing the conversation thread includes: the program code segmenting content of the conversation thread, based on each party contributing to the content; the program code modeling the segmented conversation thread utilizing neural conversation models (NCMs) to identify initial topics comprising the conversation thread; the program code generating the topic distributions for the conversation thread, based on utilizing the initial topics to access data sources.

In some embodiments of the present invention, the program code identifying the topics further includes: the program code performing a sentiment analysis on the segmented conversation thread, wherein the identifying is further based on results of the sentiment analysis.

In some embodiments of the present invention, the data sources are accessed via the Internet and are selected from the group consisting of: web forums, physical conversation samples, and messenger conversations.

In some embodiments of the present invention, the topics comprise text comprising the conversation thread and additional text predicted by the neural conversation models.

In some embodiments of the present invention, the program code generating the topic distributions, based on analyzing the conversation thread comprises the program code utilizing a neural network to analyze the conversation thread, wherein an input to the neural network comprises the conversation thread and an output of the neural network comprises the topic distributions.

In some embodiments of the present invention, the data structure comprises a tuple.

In some embodiments, of the present invention, the pre-fetched web content comprises hypertext markup language (HTML) pages.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the computing resources executing the program code referenced in FIGS. 1-4 can each be understood as a cloud computing node 10 (FIG. 6) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
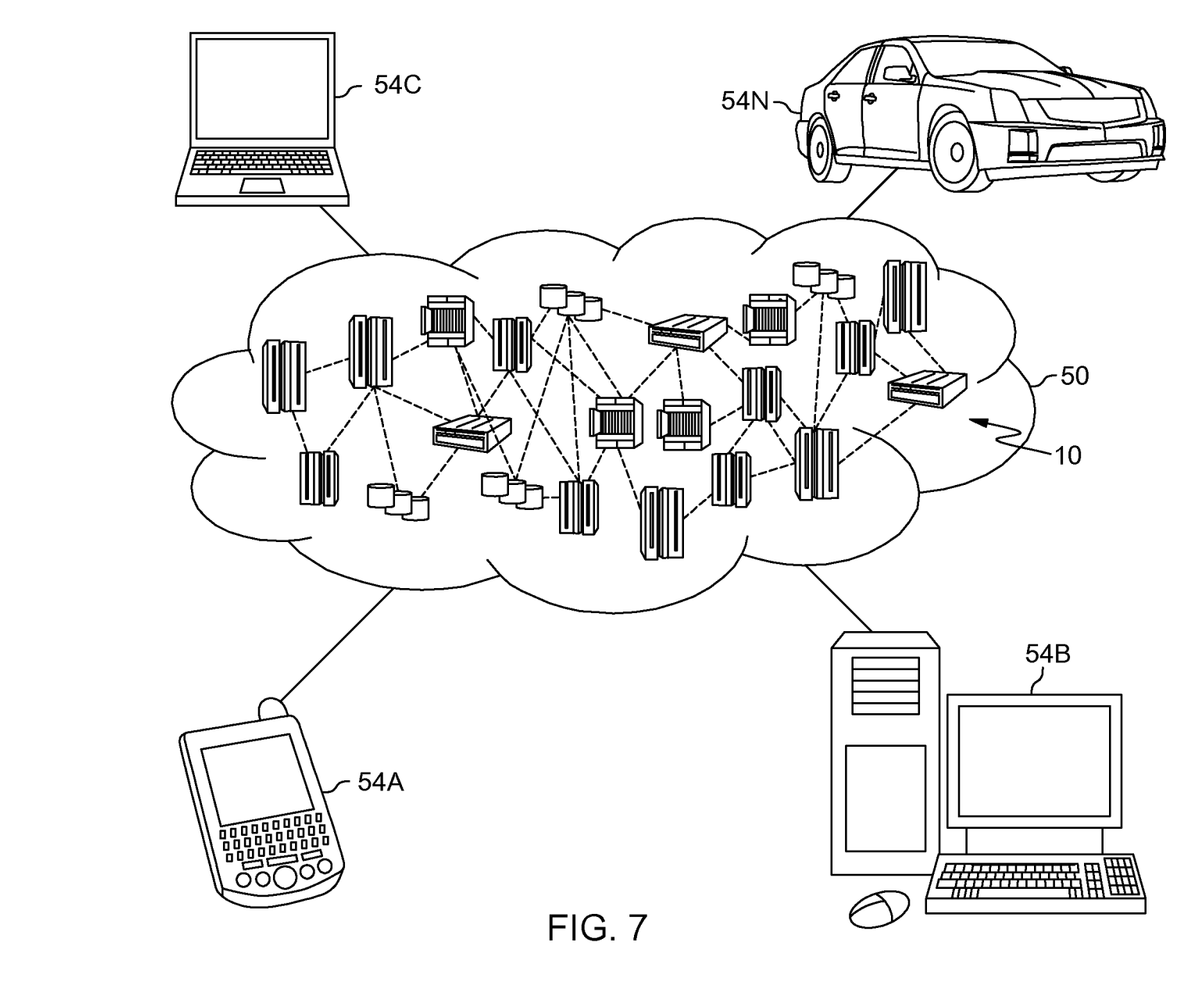
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
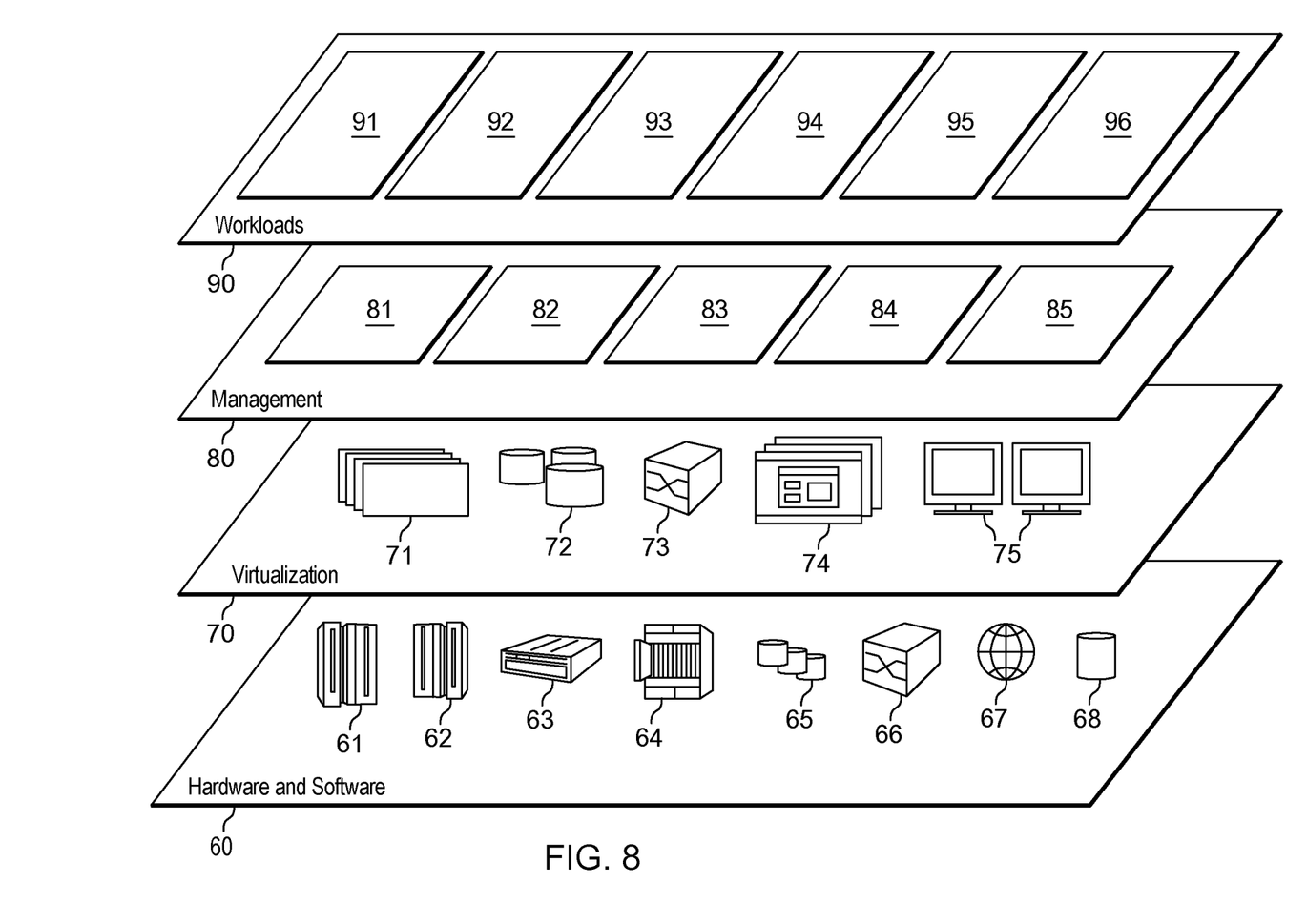
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generate an SDK that can be invoked by a bot from a legacy web page 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors, via a conversational agent executing on a client, a conversation thread;
    generating, by the one or more processors, topic distributions, based on analyzing the conversation thread;
    identifying, by the one or more processors, topics, based on the topic distributions;
    pre-fetching, by the one or more processors, web content, based on utilizing the topics identified in the topics distributions as search keywords;
    parsing, by the one or more processors, the pre-fetched web content to identify, in the pre-fetched web content, a first content type and a second content type, wherein the first content type comprises content consistent with RESTful web services (REST), and the second content type comprises content inconsistent with REST;
    filtering, by the one or more processors, the parsed pre-fetched web content, to separate the first content type from the second content type;
    based on the filtering, extracting, by the one or more processors, a signature of a REST call associated with the pre-fetched web content from the first type of content;
    based on the filtering, tokenizing, by the one or more processors, the second type of content to supply context for invoking the REST call;
    generating, by the one or more processors, a package comprising a data structure, wherein the data structure comprises the signature and the context; and
    injecting, by the one or more processors, the package into the client, wherein based on the injecting the package is invocable by the conversational agent, when the conversational agent obtains a portion of the context comprising data structure.

2. The computer-implemented of claim 1, further comprising:
    obtaining, by the one or more processors, via the conversational agent the portion of the context comprising data structure;
    invoking, by the one or more processors, the REST call, based on the obtaining;
    receiving, by the one or more processors, responsive to the REST call, data responsive to the portion of the context; and
    providing, by the one or more processors, the data to the client in a conversation format.

3. The computer-implemented method of claim 2, wherein the conversational agent comprises a bot, and wherein the bot invokes the package.

4. The computer-implemented method of claim 1, wherein the context comprises the search keywords, and wherein the portion of the context comprises one or more search keywords.

5. The computer-implemented method of claim 1, wherein generating topic distributions, based on analyzing the conversation thread comprises:
    segmenting, by the one or more processors, content of the conversation thread, based on each party contributing to the content;
    modeling, by the one or more processors, the segmented conversation thread utilizing neural conversation models (NCMs) to identify initial topics comprising the conversation thread;
    generating, by the one or more processors, the topic distributions for the conversation thread, based on utilizing the initial topics to access data sources.

6. The computer-implemented method of claim 1, wherein identifying the topics further comprises:
    performing, by the one or more processors, a sentiment analysis on the segmented conversation thread, wherein the identifying is further based on results of the sentiment analysis.

7. The computer-implemented method of claim 5, wherein the data sources are accessed via the Internet and are selected from the group consisting of: web forums, physical conversation samples, and messenger conversations.

8. The computer-implemented method of claim 5, wherein the topics comprise text comprising the conversation thread and additional text predicted by the neural conversation models.

9. The computer-implemented method of claim 1, wherein generating the topic distributions, based on analyzing the conversation thread comprises utilizing a neural network to analyze the conversation thread, wherein an input to the neural network comprises the conversation thread and an output of the neural network comprises the topic distributions.

10. The computer-implemented method of claim 1, wherein the data structure comprises a tuple.

11. The computer-implemented method of claim 1, wherein the pre-fetched web content comprises hypertext markup language (HTML) pages.

12. A computer program product comprising:
a computer readable storage medium readable by one or more processors and storing instructions for execution by the one or more processors for performing a method comprising:
- obtaining, by the one or more processors, via a conversational agent executing on a client, a conversation thread;
- generating, by the one or more processors, topic distributions, based on analyzing the conversation thread;
- identifying, by the one or more processors, topics, based on the topic distributions;
- pre-fetching, by the one or more processors, web content, based on utilizing the topics identified in the topics distributions as search keywords;
- parsing, by the one or more processors, the pre-fetched web content to identify, in the pre-fetched web content, a first content type and a second content type, wherein the first content type comprises content consistent with RESTful web services (REST), and the second content type comprises content inconsistent with REST;
- filtering, by the one or more processors, the parsed pre-fetched web content, to separate the first content type from the second content type;
- based on the filtering, extracting, by the one or more processors, a signature of a REST call associated with the pre-fetched web content from the first type of content;
- based on the filtering, tokenizing, by the one or more processors, the second type of content to supply context for invoking the REST call;
- generating, by the one or more processors, a package comprising a data structure, wherein the data structure comprises the signature and the context; and
- injecting, by the one or more processors, the package into the client, wherein based on the injecting the package is invocable by the conversational agent, when the conversational agent obtains a portion of the context comprising data structure.

13. The computer program product of claim 12, the method further comprising:
- obtaining, by the one or more processors, via the conversational agent the portion of the context comprising data structure;
- invoking, by the one or more processors, the REST call, based on the obtaining;
- receiving, by the one or more processors, responsive to the REST call, data responsive to the portion of the context; and
- providing, by the one or more processors, the data to the client in a conversation format.

14. The computer program product of claim 13, wherein the conversational agent comprises a bot, and wherein the bot invokes the package.

15. The computer program product of claim 12, wherein the context comprises the search keywords, and wherein the portion of the context comprises one or more search keywords.

16. The computer program product of claim 12, wherein generating topic distributions, based on analyzing the conversation thread comprises:
- segmenting, by the one or more processors, content of the conversation thread, based on each party contributing to the content;
- modeling, by the one or more processors, the segmented conversation thread utilizing neural conversation models (NCMs) to identify initial topics comprising the conversation thread;
- generating, by the one or more processors, the topic distributions for the conversation thread, based on utilizing the initial topics to access data sources.

17. The computer program product of claim 12, wherein identifying the topics further comprises:
- performing, by the one or more processors, a sentiment analysis on the segmented conversation thread, wherein the identifying is further based on results of the sentiment analysis.

18. The computer program product of claim 16, wherein the data sources are accessed via the Internet and are selected from the group consisting of: web forums, physical conversation samples, and messenger conversations.

19. The computer program product of claim 16, wherein the topics comprise text comprising the conversation thread and additional text predicted by the neural conversation models.

20. A system comprising:
a memory;
one or more processors in communication with the memory;
program instructions executable by the one or more processors via the memory to perform a method, the method comprising:
- obtaining, by the one or more processors, via a conversational agent executing on a client, a conversation thread;
- generating, by the one or more processors, topic distributions, based on analyzing the conversation thread;
- identifying, by the one or more processors, topics, based on the topic distributions;
- pre-fetching, by the one or more processors, web content, based on utilizing the topics identified in the topics distributions as search keywords;
- parsing, by the one or more processors, the pre-fetched web content to identify, in the pre-fetched web content, a first content type and a second content type, wherein the first content type comprises content consistent with RESTful web services (REST), and the second content type comprises content inconsistent with REST;
- filtering, by the one or more processors, the parsed pre-fetched web content, to separate the first content type from the second content type;
- based on the filtering, extracting, by the one or more processors, a signature of a REST call associated with the pre-fetched web content from the first type of content;
- based on the filtering, tokenizing, by the one or more processors, the second type of content to supply context for invoking the REST call;
- generating, by the one or more processors, a package comprising a data structure, wherein the data structure comprises the signature and the context; and
- injecting, by the one or more processors, the package into the client, wherein based on the injecting the package is invocable by the conversational agent, when the conversational agent obtains a portion of the context comprising data structure.

* * * * *